Sept. 16, 1958     R. E. BRYSON     2,852,284
LIQUID SEAL FOR ROTATING SHAFTS
Filed July 8, 1955     2 Sheets-Sheet 1

Inventor
ROY E. BRYSON
Featherstonhaugh & Co.
Attorneys

Sept. 16, 1958

R. E. BRYSON 2,852,284

LIQUID SEAL FOR ROTATING SHAFTS

Filed July 8, 1955

Inventor
ROY E. BRYSON
By Hetherstonhaugh & Co.
Attorneys

United States Patent Office 2,852,284
Patented Sept. 16, 1958

2,852,284

LIQUID SEAL FOR ROTATING SHAFTS

Roy E. Bryson, Val d'Or, Quebec, Canada

Application July 8, 1955, Serial No. 520,855

6 Claims. (Cl. 286—8)

This invention relates to liquid seal devices and particularly to devices for sealing rotating shafts against leakage as in pump and like machinery.

The invention consists essentially in the provision of an annular fluid compression chamber to take the place of solid or semi-solid packing in stuffing boxes, wherein the fluid in the compression chamber acts as a lubricant for the rotating shaft and is passed into the housing of the rotating mechanism under pressure at a controlled rate. The invention is particularly applicable to pumps or like machinery handling sand or other solid matter where abrasion and high wear on exposed metal parts and packing are serious problems. In the past, it has been the practice to pump or release water or other fluid into the stuffing box or seal chamber of such pumps and allowing the water to pass freely into the pump chamber, the expectation being that the flow of water would continuously wash through the packing to lubricate, seal and cool it and prevent the back flow of sand or slime filled water into the stuffing box or seal chamber. Such methods have not been successful and exposed parts of the stuffing box or seal chamber have had to be repaired or replaced at very short intervals. Also, after the pump has been in use and brought to a stand still there was nothing to prevent the sand or slime filling up the stuffing box or seal chamber cavity. Such a condition made it very hard to start up the equipment again, and starting H. P. was very high in addition to putting a heavy strain on the related parts. The free flow of fluid through the stuffing box or seal chamber also necessitated a very high consumption of fluid and uncontrolled dilution of the material being passed through the equipment.

In addition, wear and cavitation, particularly at the area where the shaft or wear sleeve joins the rotating member, has always been a serious problem, resulting in the shaft or wear sleeve being worn down to the extent that, in the case of wear sleeves they were cut completely through.

The above troubles have been largely overcome by the present invention where the fluid pumped into the stuffing box or seal chamber is passed through and into the interior of the machine through restricting nozzles which prevent the back flow of the sand or slime into the stuffing box or seal chamber and eliminates to a great extent the effects of wear or cavitation.

The object of the present invention is to provide a liquid seal which will isolate the main stuffing box or seal chamber of rotating mechanisms from the materials being passed through the mechanism while allowing lubricating fluid for the stuffing box or seal chamber to be passed through into the rotating mechanism.

A further object of the invention is to eliminate solid or semi-solid packing in stuffing boxes as a means of sealing rotating shafts.

A further object of the invention is to provide a liquid seal for shafts wherein the liquid pumped into the seal as a lubricant is held in an annular compression chamber and is fed into the pump chamber at a controlled rate.

A further object of the invention is to provide a liquid seal for shafts wherein the lubricating liquid in the seal is discharged into the pump chamber through high pressure nozzles.

A further object of the invention is to provide a liquid seal for shafts which will allow of a percentage of end play without effecting the efficiency of the liquid seal.

A further object of the invention is to provide a liquid seal device for shafts which can be taken apart and reassembled in a very short time without destroying the parts thereof.

These and other objects will be apparent from the specification and drawings illustrating the invention in which—

Figure 1:
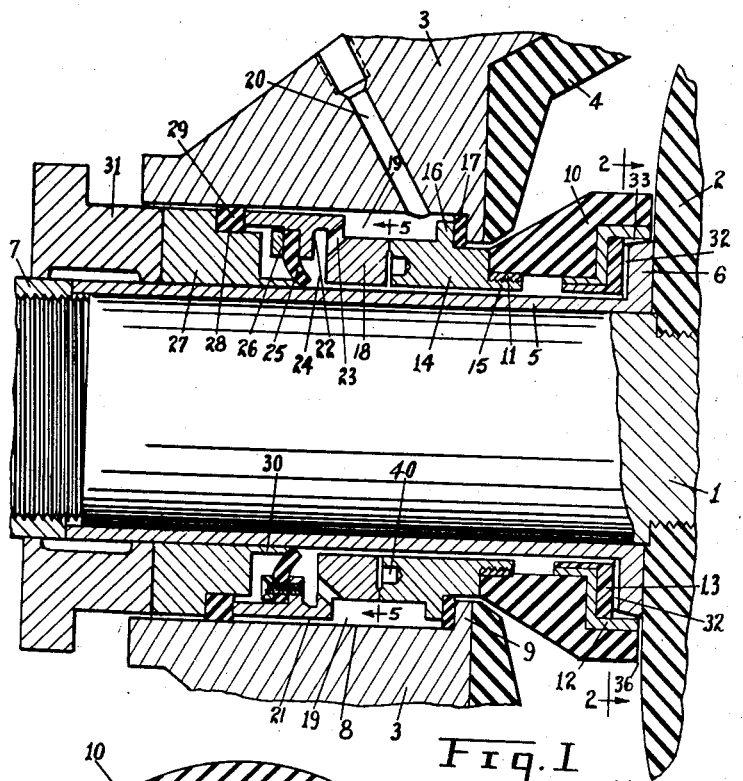
Fig. 1 is a vertical sectional elevation of the liquid seal device applied to a pump shaft.

Referring to the drawings the preferred form of the liquid seal device is shown as being applied, for illustrative purposes, to a sand pump in which the pump impeller carried by the shaft 1 is sheathed in rubber 2, and in which the pump casing 3 is lined with rubber 4. The shaft 1 is surrounded by the wear sleeve 5 which has the flange 6 bearing against the rubber sheath 2 of the impeller and is held in sealing engagement therewith by means of the collar 7 threaded on the shaft 1. The friction engagement between the flange 6 and the rubber sheath 2 of the impeller ensures that the sleeve 5 will rotate with the impeller without slippage and also without leakage of fluid or slime between the flange and impeller inwards towards the shaft 1.

The boss of the pump casing 3 is bored out to provide the bearing recess 8 and shoulder 9 at the inner end. The liner 4 of the casing 3 protects the inner wall of the casing inwards to the inner diameter of the shoulder 9.

The liquid seal device is composed of two main elements, the inner element comprising the cone shaped rubber ring or pressure controlled wear ring 10. This ring 10 is bonded at one end to the threaded ring 11 and at the other end to the Z section ring 12. The space between the rings 11 and 12 allows for considerable expansion and contraction of the ring 10 on either lateral adjustment of the shaft 1 or of the liquid seal device. The flanged thrust bearing ring 13 is a press fit in the ring 12 and is made of a suitable material depending on the fluid being passed through the seal device and through the pump. Where sand and water is being handled a fabric case Bakelite has been found suitable for the thrust bearing ring 13. The thrust bearing ring 13 is recessed back in the ring 12 in order to allow the rings 10 and 12 to overlap the flange 6 to within a short distance of the flange face 37, leaving the gap 36 between the end of the rubber ring 10 and the rubber sheath 2 of the impeller.

Figure 2:
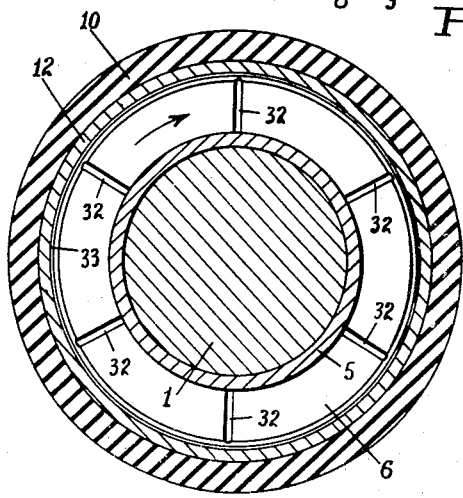
Fig. 2 is a vertical section on the line 2—2 of Fig. 1 showing the fluid discharge nozzles leading to the pump chamber.
Figure 3:
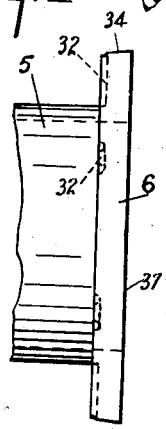
Fig. 3 is a partial side view of the shaft sleeve shown in Figs. 1 and 2.

The inner pressure ring 14 has an axially extending collar 15 threaded to engage with the threaded ring 11. The threads of the ring 11 and the collar 15 are left handed if the pump rotates in a clockwise direction as shown by the arrow in Fig. 2 of the drawings, thereby ensuring against unlocking of the assembly on rotation of the pump. Two holes 40 are drilled in the outer face of the pressure ring 14 to receive a forked key for the purpose of threading the ring 14 on to the ring 11. The pressure ring 14 has a collar 16 projecting outwardly from its outside surface. This collar supports the compressible sealing ring 17 against the shoulder 9 at the inner end of the bearing recess 8. This sealing ring 17 prevents the passage of fluid from the bearing recess 8 to the interior of the pump casing on the outer surface of the fluid seal assembly.

The intermediate pressure ring 18 abuts against the inner pressure ring 14 and has a common outer diameter therewith to form an annular fluid inlet chamber 19 with which the fluid inlet passage 20 communicates. The diameter of the outer shoulder 21 of the ring 18 is slightly less than the diameter of the bearing recess 8 to provide an annular fluid space around the ring in communication with the fluid chamber 19. The outer end of the ring 25 by means of the clamp ring 26. A series of aperfluid chamber 24 and is provided with the inwardly projecting collar 22 against which is clamped the flexible seal ring 25 by means of the clamp ring 26. A series of apertures 23 spaced around the ring 18 give unrestricted communication between the fluid chambers 19 and 24. The inner diameters of the thrust bearing ring 13, the inner pressure ring 14 and the intermediate pressure ring 18 is slightly greater than the outer diameter of the shaft wear sleeve 5 so that the fluid pressure chamber 24 extends along the sleeve 5 from the seal ring 25 to the outer face of the flange 6 of the sleeve 5.

Figure 9:
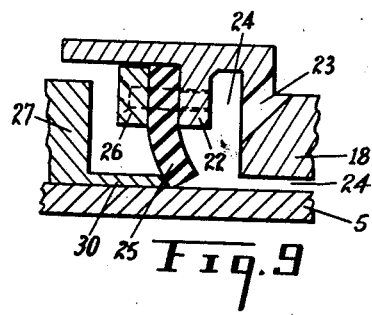
Fig. 9 is a view similar to Fig. 8 but showing the sealing ring in sealing engagement with the rotating shaft wear sleeve.

The outer pressure ring 27 is shouldered at 28 to carry the compressible seal ring 29 which is compressed between the pressure rings 27 and 18 to form a seal against the outer surface of the bearing recess 8. A thin wall collar 30 extends axially inwards from the pressure ring 27 and about the shaft sleeve 5 and bears against the unsupported inner diameter of the flexible seal ring 25 to provide a back pressure fluid seal about the sleeve 5, the seal ring being brought into a position approximately at right angles to the line of the fluid apertures 23 as shown in Figs. 1 and 9. The setting of the seal ring 25 therefore provides a ring line pressure seal on the sleeve 5 and so eliminates a large percentage of friction pressure from the rotating sleeve while preserving maximum seal pressure.

The whole assembly is held in compression within the bearing recess 8 by the gland 31 which can be secured to the pump casing by studs and nuts not shown or by any other suitable means.

Figure 4:
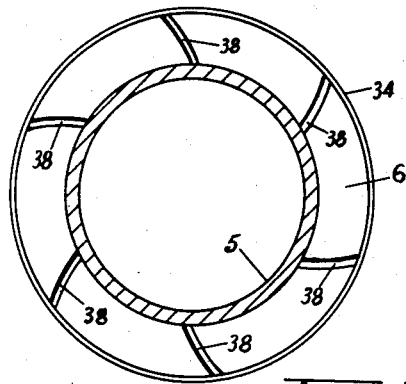
Fig. 4 is a cross section of a shaft sleeve showing a modified type of fluid discharge nozzles.
Figure 6:
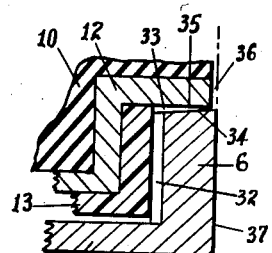
Fig. 6 is an enlarged partial sectional view of one discharge nozzle shown in Fig. 2.
Figure 5:
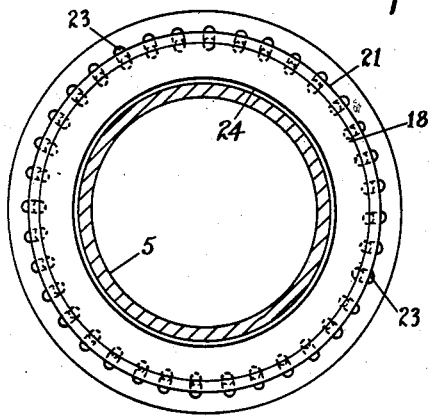
Fig. 5 is a vertical section on the line 5—5 of Fig. 1.
Figure 7:
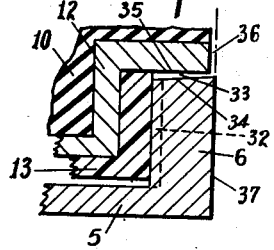
Fig. 7 is a view similar to Fig. 6 but taken to one side of the discharge nozzle.
Figure 8:
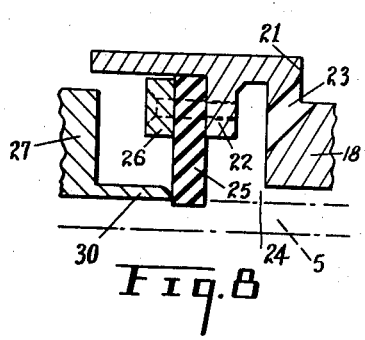
Fig. 8 is an enlarged view of the seal chamber seal remote from the body of the pump and showing the seal ring before it is forced into sealing position.

Referring particularly to Fig. 1 of the drawings the pressure fluid chamber 19 extends between the seal rings 17 and 29 while the pressure fluid chamber 24 extends from the seal ring 25 along the sleeve 5 to its flange 6. At this point leakage of the pressure fluid to the body of the pump casing is through the radial nozzles 32 into the annular space 33 between the outer diameter of the flange 6 which is tapered at 34 to form a restricted annular nozzle and the adjacent inner diameter 35 of the ring 12. It will be seen on reference to Figs. 1, 6 and 7 that there is a gap 36 between the face 37 of the flange 6 and the continuing face of the impeller 2 and the adjacent edges of the ring 12 and rubber ring 10. This gap forms a single annular outlet for the pressure fluid into the pump chamber and as the sleeve 5 with its nozzles 32 are rotating at high speed the fluid projected into the gap 36 becomes a single radiating jet washing the surface of the impeller 2 and preventing the back flow of the pumped fluid into the bearing. In Fig. 4 the face of the flange 6 is shown as having the nozzles 38 curved to give added impetus to the discharge of the pressure fluid into the body of the pump chamber. An alternative arrangement would be to have the nozzles 32 or 38 cut in the face of the thrust bearing ring 13 instead of on the flange 6 of the sleeve 5.

In the assembly of the device, before the pump impeller and its shaft are fitted, the rubber ring 10 and its component parts are brought together with the inner pressure ring 14 and seal ring 17 in the pump casing in the location shown in Fig. 1 of the drawings. The parts being brought together into tight threaded engagement by means of a key having prongs fitting into the apertures 40 in the pressure ring 14. The intermediate pressure ring 18 and the outer pressure ring 27 are then assembled together without the seal ring 29. This has the effect of pushing the collar 30 and the seal ring 25 further forward than normal thereby stretching the ring 25 and increasing its inner diameter sufficient to allow the shaft wear sleeve 5 to be inserted from the pump end without resistance from the seal ring 25. When the ring 18 is pushed home against the ring 14, and the shaft wear sleeve 5 is inserted the ring 27 is withdrawn and the seal ring 29 is fitted over the shoulder 28. The pressure ring 27 is then reinserted and the whole assembly is compressed by means of the gland 31. The impeller with its shaft 1 is now fitted and tightened up by means of the threaded collar 7 so that there is a tight seal between the rubber sheath 2 of the impeller and the flange 6 of the sleeve 5.

Adjustment of the location of the impeller in an axial direction to take up wear or for other reasons can be accomplished without disturbance or adjustment of the liquid seal as the rubber ring 10 can be compressed to a considerable extent, due to the gap between the thrust ring 13 and the threaded ring 11.

In the operation of the invention, the liquid being used as a lubricant for the stuffing box or seal chamber is pumped or released through the passage 20 into the chamber 19 and through the apertures 23 to the chamber 24. The outer diameter of the rings 14 and 18 being slightly less than the inner diameter of the stuffing box recess 8 and their inner diameter being slightly larger than the outer diameter of the sleeve 5, the fluid fills the complete annular space between the seal rings 17 and 29 and the seal ring 25 and the outlet gap 36. The relatively long pressure fluid surface on the sleeve 5 cuts down wear on the sleeve to a minimum. The outlet of the pressure fluid into the body of the pump is controlled by the size of cross section of the nozzles 32 or 38 and their number and as these nozzles are open to the thrust bearing surface of the ring 13, that surface is thoroughly lubricated at all times. By controlling the amount of fluid fed into the stuffing box and the controlled outlet of the pressure fluid into the pump, the material being passed through the pump can be held to a fixed density at all times and, where the material being passed is part of a process, the dilution caused by the leakage of pressure fluid from the stuffing box is kept under definite control. In the past, where the pressure fluid was passed through the stuffing box without a controlled outlet, the material being pumped would flow back into the stuffing box once the pump had stopped rotating. This caused excessive wear on the stuffing box and its component parts and required the application of high horse power to start up the pump. In the present case the pumped material, depending to some extent upon its consistency, cannot back flow into the stuffing box as it would first have to enter the annular gap 36, which in practice is kept as narrow as possible, and from there enter and pass down the radial nozzles 32 and 38, before entering the stuffing box area. Such exclusion of dense material from the stuffing box area prevents solidification in the stuffing box and therefore allows for easier starting up of the pump after stoppages.

By the use of a flexible pressure controlled wear sleeve 10 protecting that area of the stuffing box assembly between the impeller 2 and the side walls 4 of the pump casing, no metal parts of the shaft or sleeve are exposed to the swirling material being passed through the pump and particularly, the shaft sleeve 5 is thoroughly protected against wear and cavitation effect, thereby increasing the life of these parts many fold.

A considerable saving on the amount of fluid passed through the stuffing box or seal chamber is effected, the amount of fluid required being less than one sixth that required where the fluid passed more or less freely through the stuffing box or seal chamber.

While the above description covers the application of the invention to the sealing of a pump shaft it will be clearly understood that this is for illustrative purposes only. The described invention can be applied to sealing of the drive shaft of any rotating mechanism.

What I claim is:

1. In a liquid seal device for sealing chambers in combination, a housing including a circular sealing recess located outside of the housing in the wall of said housing and a rotatable shaft passing through said sealing recess, a series of pressure rings surrounding said drive shaft and located within said sealing recess, a compressible seal ring between the outer of said pressure rings and the wall of said sealing recess, a flexible seal ring held by an intermediate pressure ring in sealing engagement against the surface of said drive shaft, a compressible seal ring between the inner of said pressure rings and the wall of said sealing recess, a flexible annular ring mounted on the inner pressure ring and disposed between said latter pressure ring and said drive shaft, the annular space between the wall of the sealing recess and the drive shaft enclosed by said seal rings forming a fluid compression chamber, means to feed fluid under pressure into said fluid compression chamber, and controlled area passages between said flexible annular ring and said shaft and communicating at one end with the said fluid compression chamber and at the other end with said housing and forming outlet passages from said fluid compression chamber to said housing.

2. In a liquid seal device for sealing chambers in combination, a housing including a circular sealing recess located outside of the housing in the wall of said housing and a rotatable shaft passing through said sealing recess, said shaft having a flange located within said housing, a series of pressure rings surrounding said drive shaft and located within said sealing recess, a compressible seal ring between the outer of said pressure rings and the wall of said sealing recess, a flexible seal ring held by an intermediate pressure ring in sealing engagement against the surface of said drive shaft, a compressible seal ring between the inner of said pressure rings and the wall of said sealing recess, a flexible annular ring mounted on the inner pressure ring and facing against the adjacent face of the flange on said drive shaft, the annular space between the wall of the sealing recess and the drive shaft enclosed by said seal rings forming a fluid compression chamber, means to feed fluid under pressure into said fluid compression chamber, and controlled area passages on the face of the flange of said drive shaft and communicating at one end with the said fluid compression chamber and at the other end with said housing and forming outlet passages from said fluid compression chamber to said housing.

3. In a liquid seal device for rotating mechanisms in combination, a housing for the rotating mechanism including a sealing recess located outside of the housing in the wall thereof, a mechanism drive shaft passing through said sealing recess, a pressure ring located at the inner end of said sealing recess, said pressure ring having a threaded collar projecting inwardly into the housing parallel with the axis of the drive shaft and means associated with said pressure ring providing a seal for the inner end of the wall of said sealing recess, an inner compressible pressure ring secured to the threaded collar of the first mentioned pressure ring, a bearing ring recessed into the end of said compressible pressure ring and bearing against the rotating mechanism to provide a seal therewith, an outer pressure ring within the sealing recess, a sealing ring associated with said outer pressure ring sealing the outer end of said sealing recess to form with the inner seal members a fluid compression chamber about the shaft, a fluid inlet to said fluid compression chamber, and nozzle means between the bearing ring and the rotating mechanism and communicating at one end with said fluid compression chamber and at the other end with said housing to form a controlled outlet from the said fluid compression chamber to said housing.

4. In a liquid seal device for rotating mechanisms in combination, a housing for the rotating mechanism including a sealing recess located outside of the housing in the wall thereof, a mechanism drive shaft passing through said sealing recess, said shaft having an inner flange located within said housing, radiating grooves cut in the outward face of said flange, the periphery of said flange being slightly tapered from a minimum diameter at the outward face to a maximum diameter at the inner face, a pressure ring located at the inner end of said sealing recess, said pressure ring having a threaded collar projecting inwardly into the housing parallel with the axis of the drive shaft and means associated with said pressure ring providing a seal for the inner end of the wall of said sealing recess, an inner compressible pressure ring secured to the threaded collar of the first mentioned pressure ring, a thrust bearing ring recessed into the inner end of said compressible pressure ring and bearing against the grooved surface of the drive shaft flange to provide a seal therewith and forming with the tapered periphery thereof an annular nozzle, an outer pressure ring within the sealing recess, a sealing ring associated with said outer pressure ring sealing the outer end of said sealing recess to form with the inner seal members a fluid compression chamber about the shaft, a fluid inlet to said fluid compression chamber, the radiating grooves in the flange of said drive shaft communicating at their inner radial ends wtih the fluid compression chamber and at their outer radial ends with the annular nozzle at the periphery of the shaft flange to form a controlled outlet for the fluid from the fluid compression chamber to the interior of said housing.

5. In a liquid seal device for rotating mechanisms in combination, a housing for the rotating mechanism including a sealing recess located outside of the housing in the wall thereof, a mechanism drive shaft passing through said sealing recess, said shaft having an inner flange located within said housing, radiating grooves cut in the outward face of said flange, said grooves being curved spirally outwards in a direction opposite to the direction of rotation of the drive shaft, the periphery of said flange being slightly tapered from a minimum diameter at the outward face to a maximum diameter at the inner face, a pressure ring located at the inner end of said sealing recess, said pressure ring having a threaded collar projecting inwardly into the housing parallel with the axis of the drive shaft and means associated with said pressure ring providing a seal for the inner end of the wall of said sealing recess, an inner compressible pressure ring secured to the threaded collar of the first mentioned pressure ring, a thrust bearing ring recessed into the inner end of said compressible pressure ring and bearing against the grooved surface of the drive shaft flange to provide a seal therewith and forming with the tapered periphery thereof an annular nozzle, an outer pressure ring within the sealing recess, a sealing ring associated with said outer pressure ring sealing the outer end of said sealing recess and shaft to form with the inner seal members a fluid compression chamber about the shaft, a fluid inlet to said fluid compression chamber, the radiating grooves in the flange of said drive shaft communicating at their inner radial ends with the fluid compression chamber and at their outer radial ends with the annular nozzle at the periphery of the shaft flange to form a controlled outlet for the fluid from the fluid compression chamber to the interior of said housing.

6. In a liquid seal device for rotating mechanisms, in combination, a housing for the rotating mechanism including a sealing recess located outside of the housing in the wall thereof, a mechanism drive shaft passing through said sealing recess, a wear sleeve on said drive shaft, said sleeve having a flange at its inner end, radiating grooves cut in the outward face of said flange, a pressure ring located at the inner end of said sealing recess, said pressure ring having a threaded collar projecting inwardly into the housing parallel with the axis of the drive shaft and means associated with said pressure ring providing a seal for the inner end of the wall of said sealing recess, an inner compressible pressure ring secured to the threaded collar of the first mentioned pressure ring, a thrust bearing ring recessed into the end of said compressible pressure ring and bearing against the grooved surface of the flange of the wear sleeve to provide a seal therewith, an outer pressure ring within the sealing recess, a sealing ring associated with said outer pressure ring sealing the outer end of said sealing recess and wear sleeve to form with the inner seal members a fluid compression chamber about the shaft, a fluid inlet to said fluid compression chamber, the said radiating grooves in the flange of said wear sleeve communicating at their inner radial ends with the fluid compression chamber and at their outer radial ends with said housing to form controlled outlets for the fluid from the fluid compression chamber to the interior of said housing.

References Cited in the file of this patent

UNITED STATES PATENTS

| | | |
|---|---|---|
| 1,507,428 | Rottel | Sept. 2, 1924 |
| 1,667,992 | Sherwood et al. | May 1, 1928 |
| 1,683,756 | Blache | Sept. 11, 1928 |
| 2,021,346 | Allen | Nov. 19, 1935 |
| 2,232,648 | Allen | Feb. 18, 1941 |
| 2,708,126 | McLachlan et al. | May 10, 1955 |